United States Patent
Hu et al.

(10) Patent No.: US 10,027,164 B2
(45) Date of Patent: Jul. 17, 2018

(54) POWER DETERMINING APPARATUS AND ELECTRONIC APPLIANCE INCLUDING THE SAME

(71) Applicant: LG ELECTRONICS INC., Seoul (KR)

(72) Inventors: Jinseok Hu, Seoul (KR); Shinhyun Park, Seoul (KR); Byoungsuk Choi, Seoul (KR); Heesun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 498 days.

(21) Appl. No.: 14/509,501

(22) Filed: Oct. 8, 2014

(65) Prior Publication Data

US 2015/0276821 A1    Oct. 1, 2015

(30) Foreign Application Priority Data

Mar. 31, 2014  (KR) .................. 10-2014-0037586

(51) Int. Cl.
*H02J 9/06* (2006.01)

(52) U.S. Cl.
CPC ............ *H02J 9/061* (2013.01); *H02J 9/062* (2013.01); *Y10T 307/615* (2015.04); *Y10T 307/625* (2015.04)

(58) Field of Classification Search
CPC ....... H02J 9/061; H02J 9/062; Y10T 307/625; Y10T 307/615
See application file for complete search history.

(56) References Cited

U.S. PATENT DOCUMENTS

| | | | | |
|---|---|---|---|---|
| 9,281,713 | B2* | 3/2016 | Lai | G01R 31/40 |
| 9,329,650 | B2* | 5/2016 | Paul | H02J 3/14 |
| 2002/0195879 | A1* | 12/2002 | Okui | E05B 77/48 |
| | | | | 307/10.2 |
| 2006/0187600 | A1 | 8/2006 | Brown et al. | |
| 2006/0260335 | A1 | 11/2006 | Montuoro et al. | |
| 2007/0280239 | A1* | 12/2007 | Lund | H04L 45/04 |
| | | | | 370/392 |
| 2010/0052429 | A1* | 3/2010 | Nethery, III | H02H 3/003 |
| | | | | 307/85 |

(Continued)

FOREIGN PATENT DOCUMENTS

| | | |
|---|---|---|
| CH | 497 805 A | 11/1970 |
| CN | 102751779 | 10/2012 |

(Continued)

OTHER PUBLICATIONS

Korean Office Action issued in Application No. 10-2014-0037586 dated Aug. 6, 2015.

(Continued)

*Primary Examiner* — Jared Fureman
*Assistant Examiner* — Esayas Yeshaw
(74) *Attorney, Agent, or Firm* — KED & Associates, LLP

(57) ABSTRACT

A power determining apparatus is disclosed. The power determining apparatus includes a sensor for sensing a current or voltage supplied from a commercial power source or an uninterruptible power supply (UPS), and a controller for analyzing a current or voltage signal sent from the sensor, and determining which one of the commercial power source and the UPS supplies power, based on results of the analysis.

5 Claims, 5 Drawing Sheets

(56) References Cited

U.S. PATENT DOCUMENTS

| | | | | |
|---|---|---|---|---|
| 2011/0125337 | A1* | 5/2011 | Zavadsky | H02J 3/14 700/291 |
| 2011/0285362 | A1* | 11/2011 | Huomo | H02J 3/1892 323/205 |
| 2012/0181869 | A1* | 7/2012 | Chapel | H02J 9/06 307/64 |
| 2012/0206108 | A1* | 8/2012 | Waring | H02J 3/14 320/137 |
| 2012/0267957 | A1* | 10/2012 | Czarnecki | H02J 3/02 307/64 |
| 2013/0057067 | A1* | 3/2013 | Creed | H02J 3/14 307/19 |
| 2014/0265595 | A1* | 9/2014 | Cheng | H02J 9/00 307/66 |
| 2015/0236549 | A1* | 8/2015 | Budde | H02J 9/061 307/23 |
| 2015/0372485 | A1* | 12/2015 | Borean | G01D 4/00 700/275 |
| 2016/0006295 | A1* | 1/2016 | Yang | H02J 9/062 307/66 |
| 2016/0072292 | A1* | 3/2016 | Rogers | H02J 3/46 307/62 |
| 2016/0322861 | A1* | 11/2016 | Budde | H02J 7/0052 |

FOREIGN PATENT DOCUMENTS

| | | |
|---|---|---|
| EP | 0 416 569 A2 | 3/1991 |
| JP | 07-067269 A | 3/1995 |
| JP | 2001-306159 A | 11/2001 |
| JP | 2002-084682 A | 3/2002 |
| JP | 2008-020120 | 1/2008 |
| JP | 2014-014255 A | 1/2014 |
| WO | WO 85/01157 A1 | 3/1985 |
| WO | WO 2015/069006 | 5/2015 |

OTHER PUBLICATIONS

PCT International search Report issued in application No. PCT/KR 2014/007558 dated Dec. 15, 2014.
Korean Notice of Allowance dated Dec. 17, 2015 issued in Application No. 10-2014-0037586.
European Search Report dated Dec. 6, 2016 issued in Application No. 14887339.1.
Chinese Office Action (with English Translation) dated May 2, 2017 issued in Application No. 201480026980.0.

* cited by examiner (a)

(b)

POWER DETERMINING APPARATUS AND ELECTRONIC APPLIANCE INCLUDING THE SAME

CROSS-REFERENCE TO RELATED APPLICATION

This application claims priority under 35 U.S.C. § 119 to Korean Patent Application No. 10-2014-0037586 filed on Mar. 31, 2014, whose entire disclosure is hereby incorporated by reference as if fully set forth herein.

BACKGROUND

1. Field

The present invention relates to a power determining apparatus and an electronic appliance including the same and, more particularly, to a power determining apparatus for determining which one of a commercial power source and an uninterruptible power supply (UPS) supplies power and an electronic appliance including the same.

2. Background

In areas where there is a shortage of electric power, supply of electric power from a commercial power source may be frequently interrupted. In particular, when supply of electric power to a refrigerator is interrupted, there may be a problem in that food goes bad due to an increase in temperature of the storage chamber in the refrigerator.

In order to stably supply electric power to an electronic appliance even in such an environment, electric power is supplied to the electronic appliance in the above-mentioned areas for a period in which supply of electric power from a commercial power source is interrupted, using an uninterruptible power supply (UPS).

The UPS supplies electric power to the electronic appliance, using a charged battery. However, since the amount of electricity charged in the battery is limited, it may be necessary to control the electronic appliance under conditions different from normal conditions, when electric power from the UPS is used.

That is, it may be necessary to detect whether or not electric power from the UPS is supplied to the electronic appliance.

SUMMARY OF THE INVENTION

Accordingly, the present invention is directed to a power determining apparatus and an electronic appliance including the same that substantially obviate one or more problems due to limitations and disadvantages of the related art.

An object of the present invention is to provide a power determining apparatus for determining which one of a commercial power source and an uninterruptible power supply (UPS) supplies power and an electronic appliance including the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a power determining apparatus includes a sensor for sensing a current or voltage supplied from a commercial power source or an uninterruptible power supply (UPS), and a controller for analyzing a current or voltage signal sent from the sensor, and determining which one of the commercial power source and the UPS supplies power, based on results of the analysis.

The controller may determine that supply of power has been switched from the commercial power source to the UPS, when the controller detects a variation in the current or voltage.

The sensor may include a current sensor for sensing a current. In this case, the controller may determine that power switching has been generated, when the controller detects a period in which current of zero amperes is continuously generated.

The sensor may include a voltage sensor for sensing a voltage. In this case, the controller may determine that power switching has been generated, when the controller detects a variation in a waveform of the supplied voltage.

The sensor may include a voltage sensor for sensing a voltage. In this case, the controller may determine that power switching has been generated, when the controller detects a variation in zero crossing period in a waveform of the supplied voltage.

The sensor may include a voltage sensor for sensing a voltage. The voltage of the UPS may have a square waveform. In this case, the controller may determine power switching through determination as to an amplitude of a third harmonic wave of the supplied voltage.

The controller may determine that power is supplied from the UPS, when the amplitude of the third harmonic wave is greater than a predetermined value.

The sensor may include a voltage sensor for sensing a voltage. The voltage of the UPS may have a sine waveform. In this case, the controller may determine that power is supplied from the UPS, when an amplitude of a third harmonic wave of the supplied voltage or a peak value of the supplied voltage is varied under a condition that a current supplied to an electronic appliance, which is selectively connected to the commercial power source or the UPS, is varied.

It may be determined that power is supplied from the UPS, when the amplitude of the third harmonic wave is increased under a condition that the current supplied to the electronic appliance is increased.

It may be determined that power is supplied from the UPS, when the amplitude of the third harmonic wave is decreased under a condition that the current supplied to the electronic appliance is decreased.

It may be determined that power is supplied from the UPS, when the peak value of the voltage is decreased under a condition that the current supplied to the electronic appliance is increased.

It may be determined that power is supplied from the UPS, when the peak value of the voltage is increased under a condition that the current supplied to the electronic appliance is decreased.

It may be determined that power is supplied from the commercial power source, when the amplitude of the third harmonic wave or the peak value of the voltage does not vary under a condition that the current supplied to the electronic appliance varies.

In another aspect of the present invention, an electronic appliance includes a sensor for sensing a current or voltage supplied from a commercial power source or an uninterruptible power supply (UPS), and a controller for analyzing a current or voltage signal sent from the sensor, and determining which one of the commercial power source and the UPS supplies power, based on results of the analysis.

The controller may determine that supply of power has been switched from the commercial power source to the UPS, when the controller detects a variation in the current or voltage.

A power saving mode causing relatively low power consumption may be executed when the controller determines that supply of power has been switched from the commercial power source to the UPS.

The electronic appliance may include a storage chamber for storing food. The storage chamber may be kept at a temperature higher than a normal temperature of the storage chamber by a predetermined temperature in the power saving mode.

A power saving mode enabling a battery of the UPS to be used for a lengthened period of time may be executed when the controller determines that supply of power has been switched from the commercial power source to the UPS.

The sensor may include a voltage sensor for sensing a voltage. The voltage of the UPS may have a square waveform. In this case, the controller may determine power switching through determination as to an amplitude of a third harmonic wave of the supplied voltage.

The sensor may include a voltage sensor for sensing a voltage. The voltage of the UPS may have a sine waveform. The controller may determine that power is supplied from the UPS, when an amplitude of a third harmonic wave of the supplied voltage or a peak value of the supplied voltage is varied under a condition that a current supplied to the electronic appliance is varied.

It is to be understood that both the foregoing general description and the following detailed description of the present invention are exemplary and explanatory and are intended to provide further explanation of the invention as claimed.

BRIEF DESCRIPTION OF THE DRAWINGS

The embodiments will be described in detail with reference to the following drawings in which like reference numerals refer to like elements wherein.

DETAILED DESCRIPTION

Figure 1:
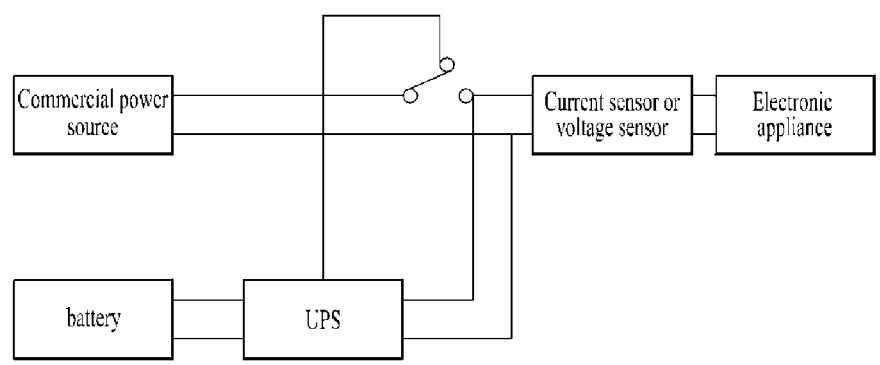
FIG. 1 is a block diagram illustrating a circuit configuration according to an embodiment of the present invention.

Reference will now be made in detail to the preferred embodiments of the present invention, examples of which are illustrated in the accompanying drawings.

In the drawings, the sizes and shapes of constituent elements may be exaggeratedly illustrated for clarity and convenience of explanation. Further, the following terms are defined in consideration of the configurations and functions in the present invention and may be construed in different ways by intention or practice of users and operators. Therefore, the definitions of terms used in the present disclosure should be construed based on the contents of the disclosure.

Figure 2:
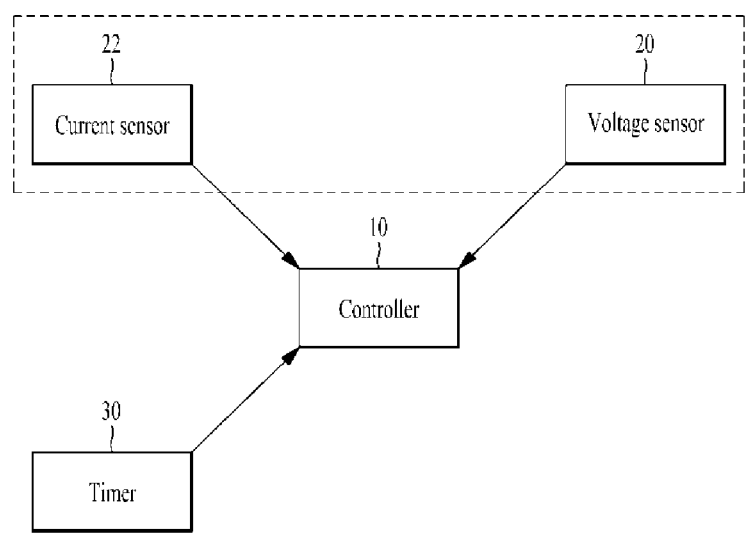
FIG. 2 is a block diagram illustrating a power determining apparatus according to an embodiment of the present invention.

FIG. 1 is a block diagram illustrating a circuit configuration according to an embodiment of the present invention. FIG. 2 is a block diagram illustrating a power determining apparatus according to an embodiment of the present invention.

Generally, electric power from a commercial power source connected to an electric power company is supplied to an electronic appliance and, as such, the electronic appliance may be driven. When supply of electric power from the commercial power source is interrupted due to instability of the commercial power source, electricity from an uninterruptible power supply (UPS) is supplied to the electronic appliance in accordance with switching of a switch connected between the commercial power source and the UPS.

In this case, the UPS may use a battery charged during supply of electric power from the commercial power source.

That is, the switch may perform circuit switching to supply electric power from the UPS to the electronic appliance when supply of electric power from the commercial power source is interrupted. When supply of electric power from the commercial power source is resumed, the switch may perform circuit switching to supply electric power from the commercial power source while cutting off supply of electric power from the UPS.

No detailed description will be given of the above-described operations of the switch because such operations are obvious to a person skilled in the art.

In accordance with the illustrated embodiment of the present invention, a sensor is provided to sense a current or voltage supplied to the electronic appliance. In this case, the sensor may include a current sensor 22 to sense a current supplied to the electronic appliance. Alternatively, the sensor may include a voltage sensor 20 to sense a voltage supplied to the electronic appliance.

In the power determining apparatus according to the illustrated embodiment of the present invention, only one of the current sensor 22 and voltage sensor 20 may be installed to selectively sense current or voltage.

The power determining apparatus also includes a controller 10, which may receive a signal associated with the current sensed by the current sensor 22. The controller 10 may also receive a signal associated with the voltage sensed by the voltage sensor 20.

The current sensor 22 or voltage sensor 20 may sense a waveform of current or voltage.

The controller 10 may analyze a voltage or current signal received from the sensor. Based on the results of analysis, the controller 10 may determine which one of the commercial power source and the UPS supplies power.

When the controller 10 detects a voltage or current variation, the controller 10 may determine that supply of power was switched from the commercial power source to the UPS at the time of voltage or current variation.

Meanwhile, a timer 30 to provide information as to passage of time may be provided at the controller 10.

When supply of power is switched from the commercial power source to the UPS, there may be a moment that supply of power may be temporarily interrupted. This is because a time for switching of the switch is practically required to enable supply of power from the UPS, even though the problem of the commercial power source is not taken into consideration.

Figure 3:
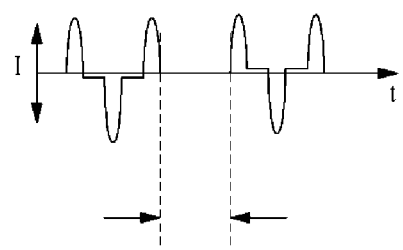
FIG. 3 is a diagram explaining a current variation.

FIG. 3 is a diagram explaining current variation. The following description will be given with reference to FIG. 3.

In FIG. 3, the x-axis represents time, and the y-axis represents a value of supplied current.

In the example of FIG. 3, a current value measured by the current sensor 22 may be sent to the controller 10. That is, the controller 10 may determine variation of power in accordance with variation in the current value.

Current is supplied to the electronic appliance under the condition that the current has a particular waveform. During continuous supply of electric power from the commercial power source, however, there is no period in which a moment that current becomes zero is continuously generated. Similarly, during continuous supply of electric power from the UPS, there is no period in which a moment that current becomes zero is continuously generated.

Practically, in a period defined between arrows in FIG. 3, however, supply of power is switched from the commercial power source to the UPS. In this period, current is continuously maintained at zero amperes. Accordingly, when this period is detected, it may be determined that supply of power is switched from the commercial power source to the UPS.

At a time when power switching is generated, switching operation of the switch is generated. At this time, there is no output from the UPS and, as such, the value of supplied current may be zero.

That is, when power switching is generated, the waveform of current supplied to the electronic product is varied.

Generally, if there is no problem in supplying power, power is supplied from the commercial power source. In this regard, when power switching is generated, it may be determined that power is supplied from the UPS after the time when power switching is generated.

Figure 4:
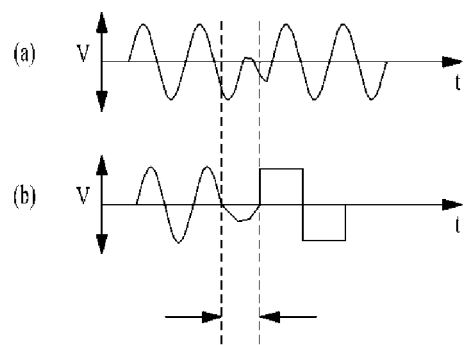
FIG. 4 is a diagram explaining distortion of voltage.

FIG. 4 is a diagram explaining distortion of voltage. The following description will be given with reference to FIG. 4.

In FIG. 4, the x-axis represents time, and the y-axis represents voltage.

FIG. 4(a) illustrates a waveform of voltage when supply of power is switched from the commercial power source, which supplies power having a sine waveform, to the UPS, which supplies power having a sine waveform. FIG. 4(b) illustrates a waveform of voltage when supply of power is switched from the commercial power source, which supplies power having a sine waveform, to the UPS, which supplies power having a square waveform.

The voltage sensor 20 may sense a value of voltage supplied to the electronic appliance with the passage of time.

When a problem occurs in the commercial power source during supply of a voltage having a constant sine waveform from the commercial power source, supply of power may be interrupted. In this case, the waveform of the voltage supplied from the commercial power source is varied, as illustrated in FIG. 4.

That is, in a period defined between arrows in FIG. 4, a voltage waveform different from a voltage waveform sensed before the period is formed. Accordingly, when this period is detected, it may be determined that power switching has been generated.

In particular, in the case in which the UPS supplies a voltage having a square waveform, it may be determined that, if the waveform of a voltage sensed by the voltage sensor 20 is varied, power switching has been generated. In this case, the voltage waveform variation may mean generation of voltage distortion.

Figure 5:
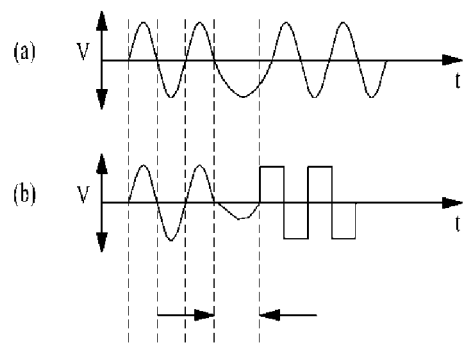
FIG. 5 is a diagram explaining a variation in zero crossing period.

FIG. 5 is a diagram explaining a variation in zero crossing period. The following description will be given with reference to FIG. 5.

In FIG. 5, the x-axis represents time, and the y-axis represents voltage.

FIG. 5(a) illustrates a waveform of voltage when supply of power is switched from the commercial power source, which supplies power having a sine waveform, to the UPS, which supplies power having a sine waveform. FIG. 5(b) illustrates a waveform of voltage when supply of power is switched from the commercial power source, which supplies power having a sine waveform, to the UPS, which supplies power having a square waveform.

The voltage sensor 20 may sense a value of voltage supplied to the electronic appliance with the passage of time.

When the zero crossing period of a voltage sensed by the voltage sensor 20 is varied, the controller 10 may determine generation of power switching.

That is, although power supplied from the commercial power source has a voltage waveform having a constant zero crossing period, the zero crossing period is varied to a period defined between two arrows in FIG. 5 when supply of power is switched from the commercial power source to the UPS. That is, the zero crossing period before power switching differs from the zero crossing period at the time when power switching is generated. The controller 10 senses such a voltage waveform variation and, as such, may determine that power switching has been generated.

In particular, in the case in which the UPS supplies a voltage having a square waveform, it may be determined that, if the waveform of a voltage sensed by the voltage sensor 20 is varied, power switching has been generated.

Figure 6:
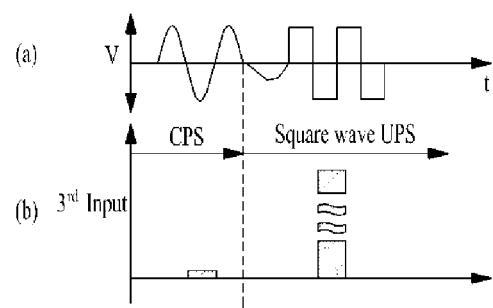
FIG. 6 is a diagram explaining variation of a third harmonic wave in the case in which power supplied from an uninterruptible power supply (UPS) has a square waveform.

FIG. 6 is a diagram explaining variation of a third harmonic wave in the case in which power supplied from the UPS has a square waveform. The following description will be given with reference to FIG. 6.

When the third harmonic wave of a voltage supplied from the UPS in the case in which the supplied voltage has a square waveform is analyzed, it may be found that the third harmonic wave has a greater amplitude than that of a voltage supplied from the commercial power source. Using such a difference, accordingly, the controller 10 may determine which one of the commercial power source, which supplies power having a sine waveform, and the UPS, which supplies power having a square waveform, supplies power.

That is, the controller 10 may determine power switching through determination as to the amplitude of the third harmonic wave of the supplied voltage.

In this case, the controller 10 may determine that power is supplied from the UPS when the amplitude of the third harmonic wave is greater than a predetermined value. The predetermined value may be a value greater than a third harmonic wave amplitude calculated for the commercial power source, but smaller than a third harmonic wave amplitude calculated for the UPS.

Figure 7:
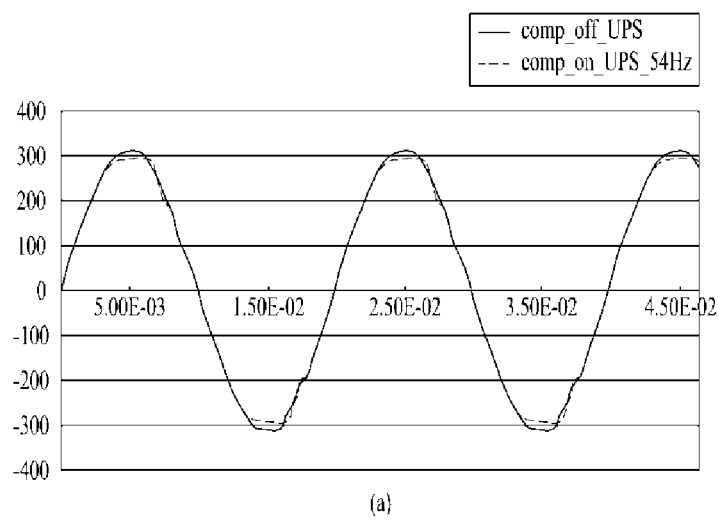
FIG. 7 is a diagram explaining a waveform of an input voltage when power from a commercial power source or power from a UPS is supplied.
Figure 7:
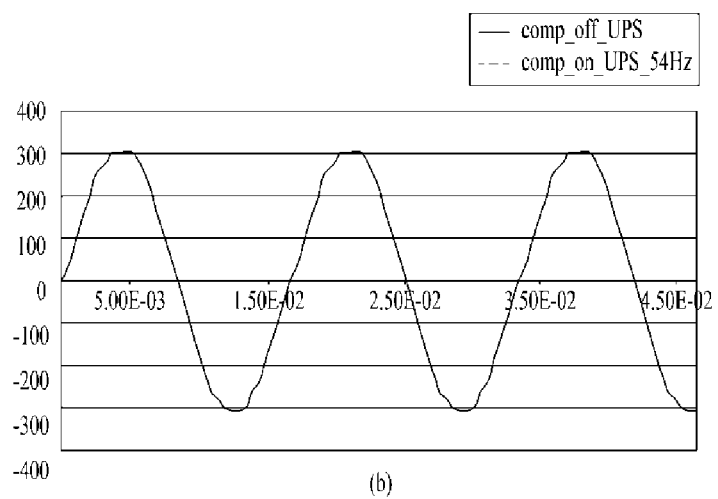

FIG. 7 is a diagram explaining a waveform of an input voltage when power from the commercial power source or power from the UPS is supplied. The following description will be given with reference to FIG. 7.

FIG. 7A illustrates a voltage waveform of power when power from the UPS is supplied to an electronic appliance, in particular, a compressor included in a refrigerator. Referring to FIG. 7A, it may be seen that the voltage waveform of the power supplied from the UPS is varied in accordance with a frequency of the supplied power.

In this case, the UPS supplies a voltage having a sine waveform to the electronic appliance.

FIG. 7B illustrates a voltage waveform of power when power from the commercial power source is supplied to an electronic appliance, in particular, a compressor included in a refrigerator. Referring to FIG. 7B, it may be seen that the voltage waveform of the power supplied from the commercial power source is substantially uniform.

After comparison between the case of FIG. 7A and the case of FIG. 7B, it may be seen that, when power from the commercial power source is supplied, a high peak voltage value is exhibited, as compared to the case in which power from the UPS is supplied. That is, when power form the UPS is supplied to the electronic appliance, there may be a phenomenon in which the peak voltage value of the supplied power is dropped, as compared to the case in which power from the commercial power source is supplied.

This is because "Z_UPS>>Z_CPS" is established between output impedance Z_CPS of power from the commercial power source and output impedance Z_UPS of power from the UPS.

Meanwhile, using the above-described characteristics, it may be possible to determine which one of the commercial power source and the UPS currently supplies power to the electronic appliance.

In this case, however, there may be a drawback in that the interval to sense the value of voltage supplied to the electronic appliance is shortened. When the voltage value sensing interval is shortened, an increased load is generated at the electronic appliance. For this reason, there may be a drawback in that, for the controller 10, a product having an increased capacity is required.

In order to solve the above-described problems, a system of calculating a third harmonic wave is proposed in accordance with an embodiment of the present invention, in place of direct sensing of an input voltage value.

Figure 8:
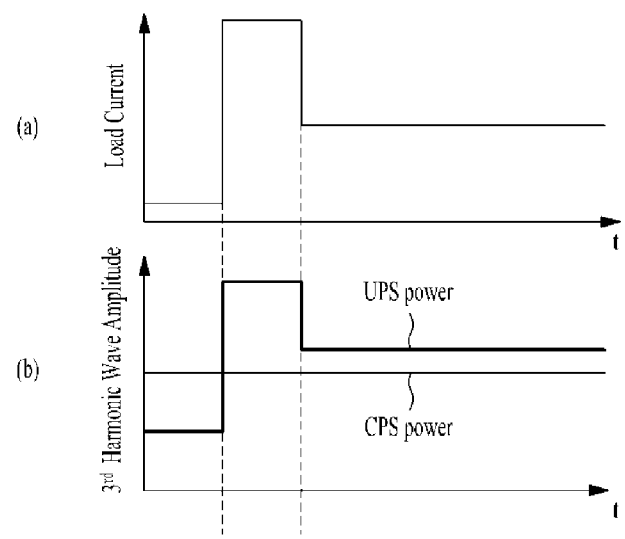
FIG. 8 is a diagram explaining a variation in third harmonic wave when load current is varied.

FIG. 8 is a diagram explaining variation in third harmonic wave when load current is varied. The following description will be given with reference to FIG. 8.

FIG. 8(a) illustrates variation of load current supplied to the electronic appliance. FIG. 8(b) illustrates a waveform of a third harmonic wave when the electronic appliance is connected to the UPS, and a waveform of a third harmonic wave when the electronic appliance is connected to the commercial power source.

When power switching is generated, current supplied to the electronic appliance may be varied. In this case, current variation may be intentionally generated. However, current variation may be naturally generated due to driving of the electronic appliance. For example, when it is assumed that the electronic appliance is a refrigerator, there may be a condition that current is supplied to a compressor of the refrigerator. The compressor necessarily performs a lubrication mode, and then performs a driving mode in which the compressor is driven at normal RPM. Current supplied to the compressor in the lubrication mode differs from current supplied to the compressor in the driving mode. Under such conditions, it is unnecessary to intentionally vary current supplied to the electronic appliance in order to enable the controller 10 to detect power switching because load current supplied to operate the electronic appliance is naturally varied.

If the amplitude of the third harmonic wave is varied when the load current supplied to the electronic appliance is varied, as illustrated in FIG. 8(b), it may be determined that power is supplied form the UPS.

The controller 10 may determine that power is supplied from the UPS, if the amplitude of the third harmonic wave is increased when the current supplied to the electronic appliance is increased.

On the other hand, if the amplitude of the third harmonic wave is decreased when the current supplied to the electronic appliance is decreased, the controller 10 may determine that power is supplied from the UPS.

Meanwhile, if the amplitude of the third harmonic wave is not varied when the current supplied to the electronic appliance is varied, the controller 10 may determine that power is supplied from the commercial power source.

Under the condition that power is supplied from the commercial power source, the third harmonic wave has a constant value without being varied, irrespective of load current.

Figure 9:
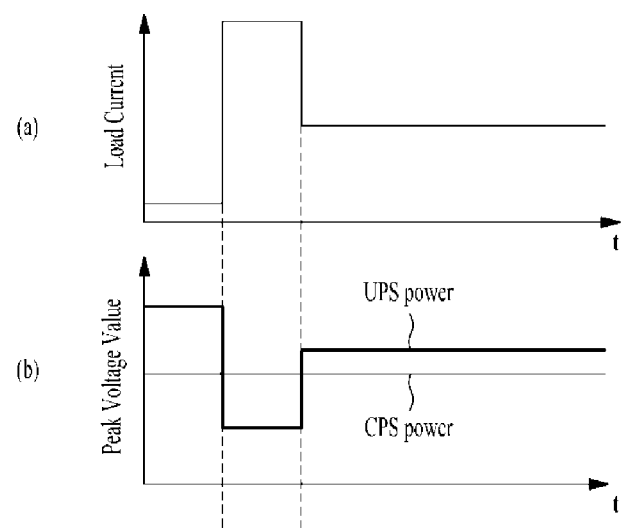
FIG. 9 is a diagram explaining a variation in peak voltage value when load current is varied.

FIG. 9 is a diagram explaining a variation in peak voltage value when load current is varied. The following description will be given with reference to FIG. 9.

If the peak voltage value is decreased when current supplied to the electronic appliance is increased, it may be determined that power is supplied from the UPS.

On the other hand, if the peak voltage value is increased when current supplied to the electronic appliance is decreased, it may be determined that power is supplied from the UPS.

Meanwhile, if the peak voltage value is not varied when current supplied to the electronic appliance is varied, it may be determined that power is supplied from the commercial power source.

Under the condition that power is supplied from the commercial power source, the peak voltage value is constant without being varied, irrespective of load current.

Figure 10:
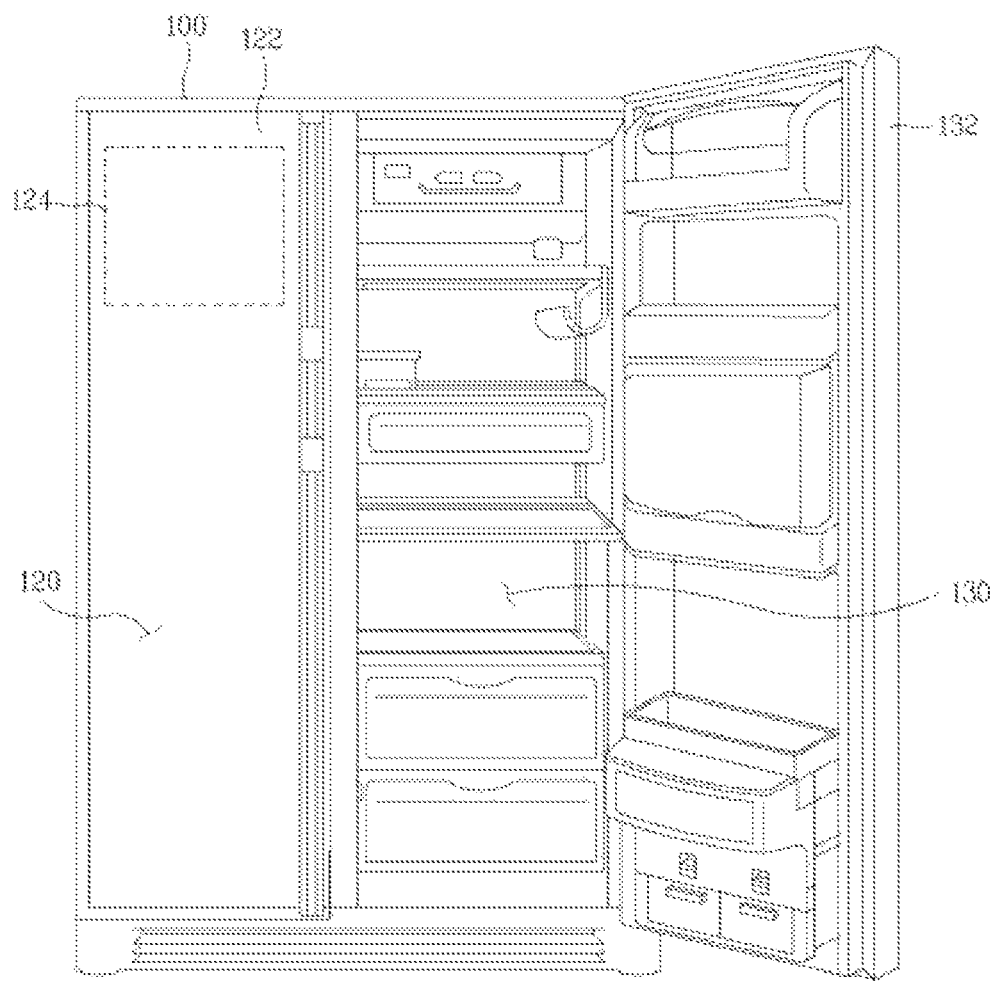
FIG. 10 is a view illustrating a refrigerator as an example of an electronic appliance, to which the present invention is applied.

FIG. 10 is a view illustrating a refrigerator, to which the present invention is applied. Although the present invention is not limited to a refrigerator, the following description will be given in conjunction with an example in which the present invention is applied to a refrigerator, for convenience of description. In other words, the present invention is applicable to a food storage apparatus having a sealed structure capable of cooling food, in addition to a refrigerator. The following description will be given with reference to FIG. 10.

The above-described power determining apparatus may be installed at a refrigerator 100.

In this case, it may be possible to drive the refrigerator 100 in a power saving mode when the power determining apparatus determines that power is supplied from the UPS.

Here, the power saving mode may mean that the storage chamber of the refrigerator 100 is maintained at a temperature higher than a temperature set by the user by a predetermined temperature. Of course, the power saving mode may mean a mode in which power consumption is relatively small and, as such, the battery of the UPS may be used for a lengthened period of time.

The refrigerator 100 according to the present invention may be applied to a top mount type in which a freezing compartment 120 and a refrigerating compartment 130 are disposed at upper and lower sides, respectively, and a bottom freezer type in which the refrigerating compartment 130 and the freezing compartment 120 are disposed at upper and lower sides, respectively.

However, the following description will be given in conjunction with a side-by-side type refrigerator in which the freezing compartment 120 and the refrigerating compartment 130 are laterally divided.

In the refrigerator 100, the freezing compartment 120 is formed at a right side, and the refrigerating compartment 130 is formed at a left side. Generally, the refrigerating compartment 130 stores food while being maintained at a temperature above zero while being higher than that of the freezing compartment 120.

The refrigerator 100 includes a body to define an appearance of the refrigerator 100. The body of the refrigerator 100 protects machinery accommodated therein while sealing the machinery from the outside.

The refrigerator 100 maintains the interior thereof at low temperature, using devices constituting a refrigerant cycle while being accommodated in a machinery chamber (not shown) formed at a lower portion of the refrigerator 100 and, as such, food is kept fresh. Cold air generated by the refrigerant cycle may be supplied to a storage chamber 124 via a cold air supplier, which will be described later.

The refrigerant cycle supplies, to the freezing compartment 120, cold air lowered to low temperature, using an evaporator (not shown) to change the phase of refrigerant from a liquid phase into a gaseous phase, for heat exchange of the refrigerant with ambient air. Cold air keeps the freezing compartment 120 at a temperature below zero.

In addition, the refrigerator 100 is provided with a freezing compartment door 122 to open or close the freezing compartment 120, and a refrigerating compartment door 132 to open or close the refrigerating compartment 130. The freezing compartment door 122 and refrigerating compartment door 132 are pivotably mounted to the body of the refrigerator 100

Meanwhile, the freezing compartment door 122 is provided with the storage chamber 124 in order to separately store food in accordance with a user's intension. Of course, the storage chamber 124 may be provided at the interior of the freezing compartment 120, without being provided at an inner wall of the refrigerating compartment door 122.

In this case, the storage chamber 124 may be sealed from other internal regions of the freezing compartment 120. That is, it may be possible to cool or heat the interior of the storage chamber 124 without any influence upon the outside of the storage chamber 124. Accordingly, it may be possible to keep food stored in the storage chamber 124 in an environment different from that of food stored in the freezing compartment 120.

In other words, when the storage chamber 124 is sealable, it may be possible to easily achieve temperature measurement or temperature control of the storage chamber 124.

Meanwhile, the storage chamber 124 may have a lid to allow food to be easily put into or taken out of the storage chamber 124. The storage chamber 124 may have a rectangular parallelepiped shape. Of course, the storage chamber 124 is not limited to such a shape.

As apparent from the above description, in accordance with the present invention, it may be possible to determine which one of a commercial power source and a UPS supplies power.

Accordingly, when it is sensed that power form the UPS is supplied to an electronic appliance, driving conditions of the electronic appliance may be varied to enable the battery of the UPS to be used for a lengthened period of time and, as such, it may be possible to prevent additional power failure caused by consumption of UPS power.

In addition, when power from the UPS is supplied to the electronic appliance, the electronic appliance is driven in a power saving mode causing small power consumption and, as such, it may be possible to stably drive the electronic appliance until supply of power from the commercial power source is recovered.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
   a body having at least one of a freezing compartment or a refrigerating compartment;
   a refrigerant cycle including a compressor and an evaporator;
   a sensor configured to sense a current or a voltage supplied from a power source to the refrigerator, the power source including a commercial power source and an uninterruptible power supply (UPS), and the sensor including at least one of a current sensor that senses the current or a voltage sensor that senses the voltage; and
   a controller configured to receive current or the voltage information detected by the sensor and to analyze the received current or voltage information to determine whether the power source supplied to the refrigerator is switched from the commercial power source to the UPS,
   wherein when the controller detects a variation in the current sensed by the current sensor or the voltage sensed by the voltage sensor, the controller is further configured to determine that the power source has switched from the commercial power source to the UPS, and
   wherein the controller is further configured to determine that the power source has switched between the commercial power source and the UPS based on a change of an amplitude of a third harmonic wave of the supplied voltage and to control the compressor to be operated in a power saving mode to lower power consumption when the power source has switched from the commercial power source to the UPS.

2. The refrigerator of claim 1, wherein the voltage of the UPS has a square waveform.

3. The refrigerator of claim 2, wherein the controller is further configured to determine that power is being supplied by the UPS when the amplitude of the third harmonic wave is greater than a prescribed value.

4. The refrigerator of claim 1, wherein the voltage of the UPS has a sinusoidal waveform.

5. The refrigerator of claim 4, wherein the controller is configured to determine that power is being supplied by the UPS when the amplitude of the third harmonic wave increases while the current supplied to the refrigerator increases while the compressor is performing a lubrication mode, and
   wherein the controller is configured to determine that power is being supplied by the UPS when the amplitude of the third harmonic wave decreases while the current supplied to the refrigerator decreases while the compressor is performing a driving mode.

\* \* \* \* \*